Figure 1:
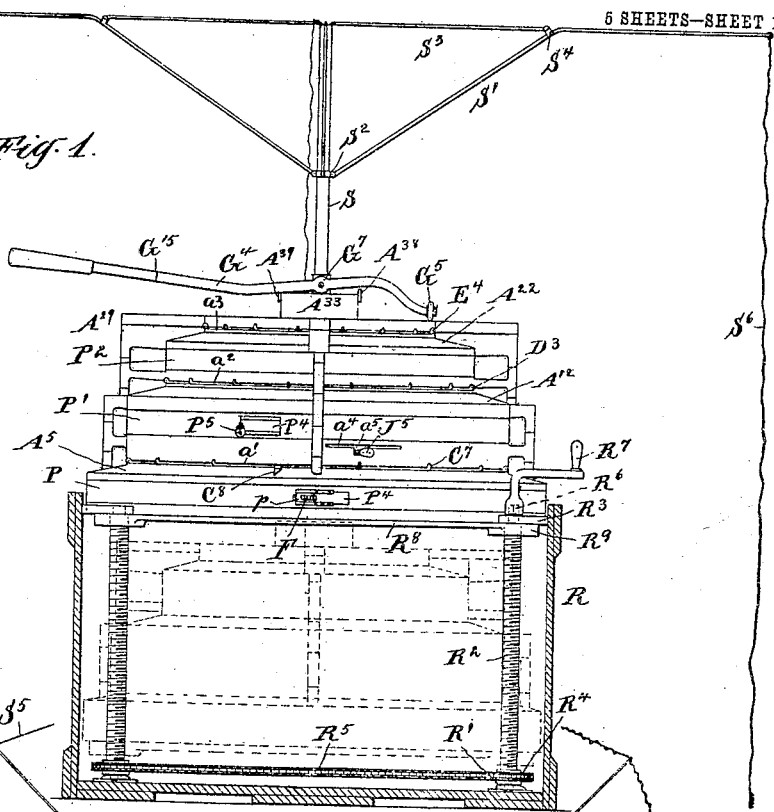

No. 818,165. PATENTED APR. 17, 1906.
C. F. HARRINGTON.
VOTING MACHINE.
APPLICATION FILED OCT. 10, 1904.

5 SHEETS—SHEET 1.

Witnesses:
Harry C. Harrington
B. F. Kapp

Inventor:
Charles F. Harrington,
by his attorney,
Charles R. Searle.

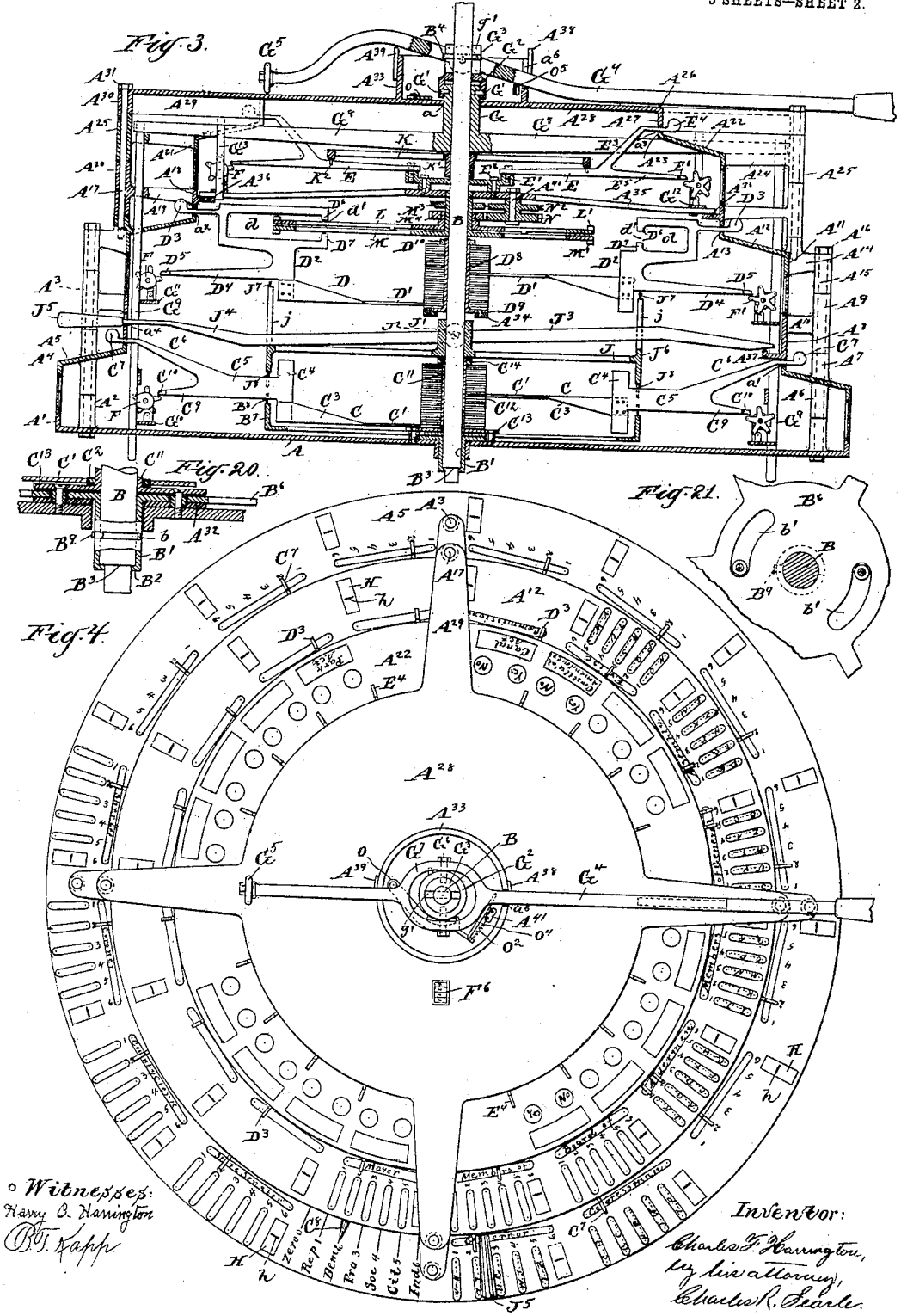

No. 818,165.
PATENTED APR. 17, 1906.
C. F. HARRINGTON.
VOTING MACHINE.
APPLICATION FILED OCT. 10, 1904.
5 SHEETS—SHEET 3.
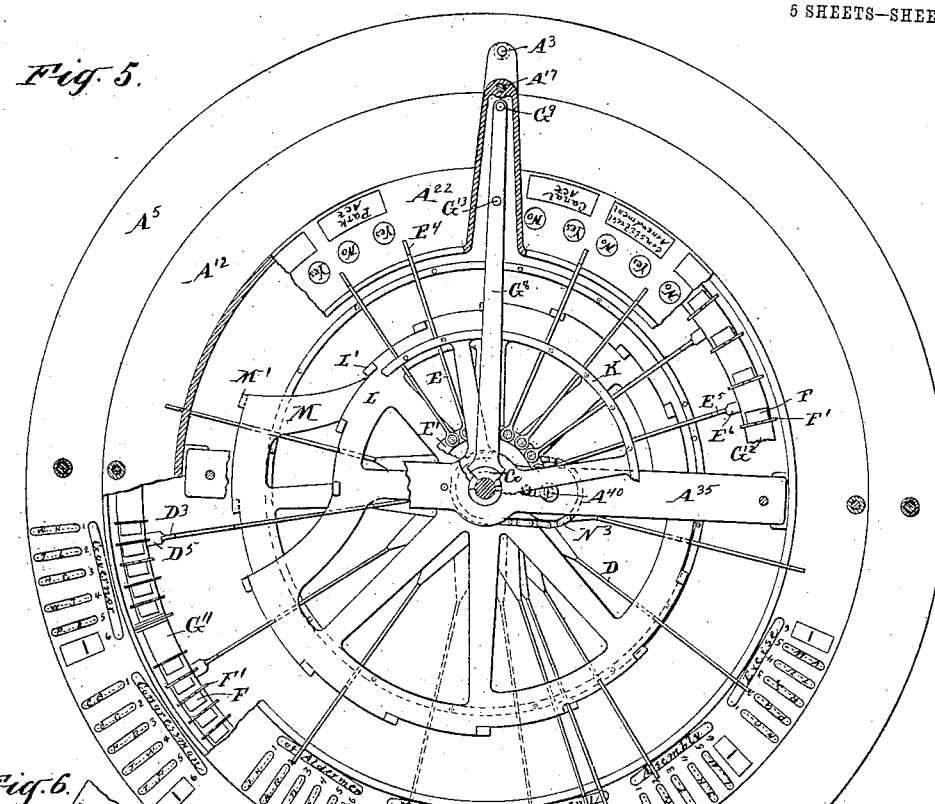
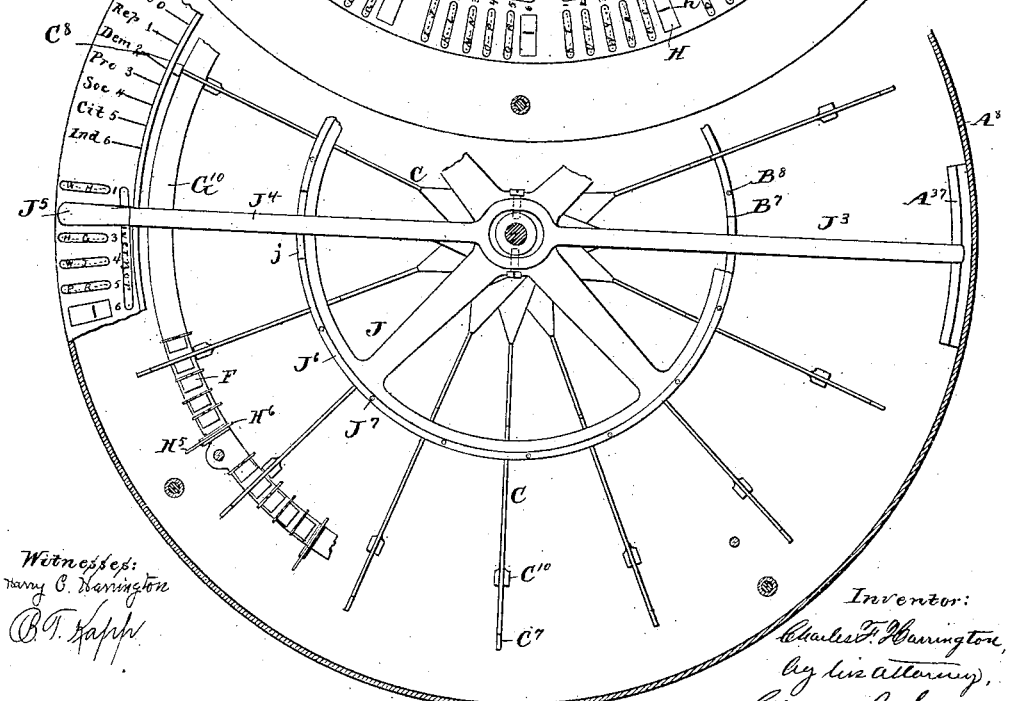

No. 818,165.
PATENTED APR. 17, 1906.
C. F. HARRINGTON.
VOTING MACHINE.
APPLICATION FILED OCT. 10, 1904.
5 SHEETS—SHEET 4.
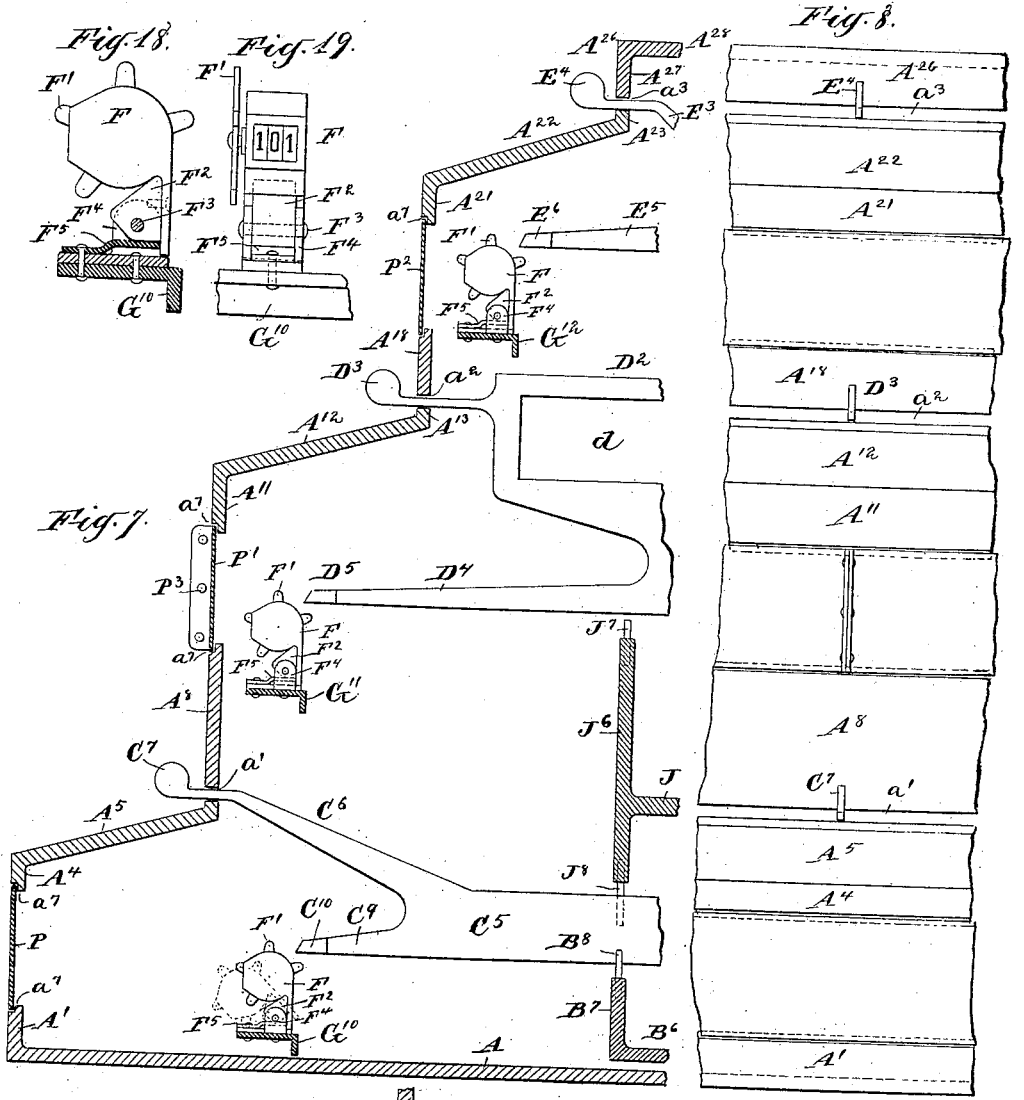
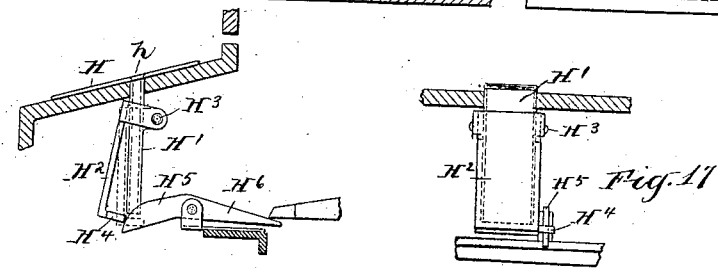
Witnesses:
Harry C. Harrington
B. T. Kapp
Inventor:
Charles F. Harrington,
by his attorney,
Charles R. Searle.

No. 818,165. PATENTED APR. 17, 1906.
C. F. HARRINGTON.
VOTING MACHINE.
APPLICATION FILED OCT. 10, 1904.
5 SHEETS—SHEET 5.
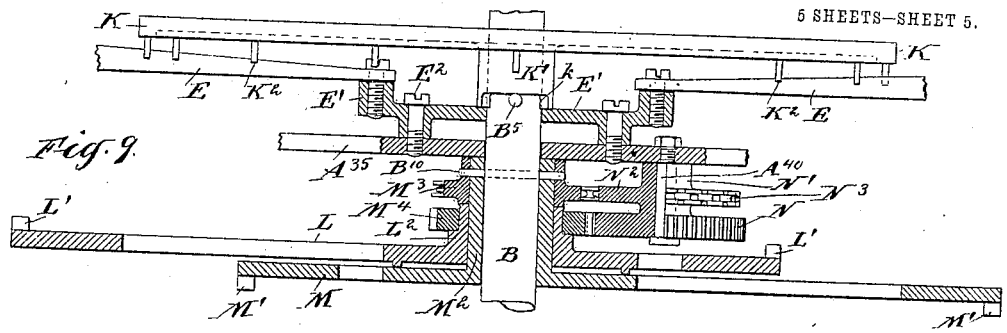
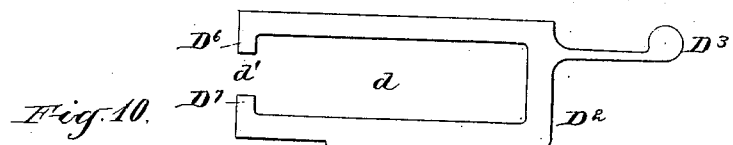
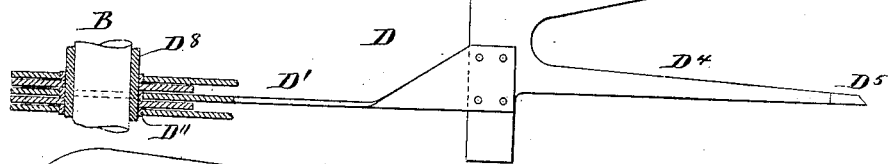
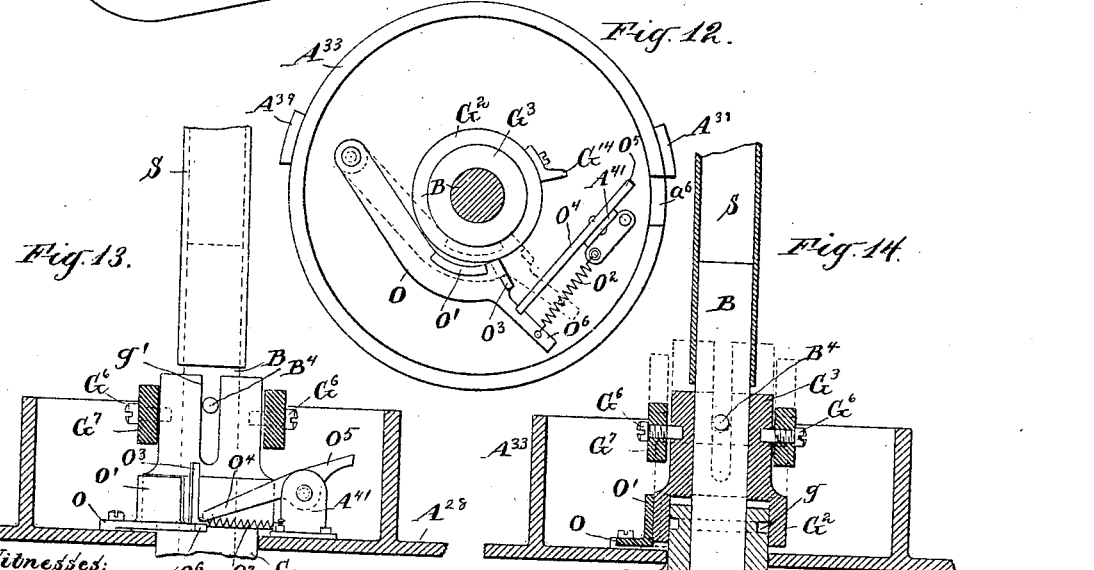
Witnesses:
Harry C. Harrington
B. F. Kapp
Inventor:
Charles F. Harrington,
by his attorney,
Charles R. Searle.

UNITED STATES PATENT OFFICE.

CHARLES F. HARRINGTON, OF LYNDHURST, NEW JERSEY, ASSIGNOR TO THE DIAL VOTING MACHINE COMPANY, OF LYNDHURST, NEW JERSEY, A CORPORATION OF NEW JERSEY.

VOTING-MACHINE.

No. 818,165.  Specification of Letters Patent.  Patented April 17, 1906.

Application filed October 10, 1904. Serial No. 227,800.

*To all whom it may concern:*

Be it known that I, CHARLES F. HARRINGTON, a citizen of the United States, residing at Lyndhurst, in the county of Bergen and State of New Jersey, have invented a certain new and useful Improvement in Voting-Machines, of which the following is a specification.

The invention relates to mechanical means for registering the choice of candidates for office by the voters in an election.

The object of the invention is to provide a machine which shall be simple in construction and operation, easily set by the voter to register his selection of candidates or party, and when so set acting directly upon the several counters without the employment of delicate and complicated intermediate mechanism liable to derangement, and which shall conform to the requirements of the election laws, occupy but little space, and be easily transported and set up for service.

The machine comprises a casing or turret in the form of superposed cylinders, each of smaller diameter than the next below, thus forming a succession of circular decks upon which the names of the candidates for the several offices are radially arranged in the order of the several parties. Through an annular slot in each turret above each deck project the ends of a series of radial bars or actuators which may be moved to the name selected. When the desired actuators are thus set, they are in operative relation to corresponding counters on which the votes for the selected names are registered. Means are provided for effecting the registering movement simultaneously, for easily setting all the actuators to the names of all the candidates on a party-ticket, and for conditioning the machine for the next voter. Means are also provided for balloting for independent candidates whose names are not upon the ticket of either party for a selected office, for throwing out of service any counters or series of counters not required in any election, and for insuring entire secrecy of the selections made by any voter and the number of votes cast for any candidate, and for easily and quickly ascertaining the result of the vote for each office.

The invention consists in certain novel features and arrangements of parts and details of construction by which the above objects are attained, to be hereinafter described.

The accompanying drawings form a part of this specification and show a preferred form of the invention.

Figure 2:
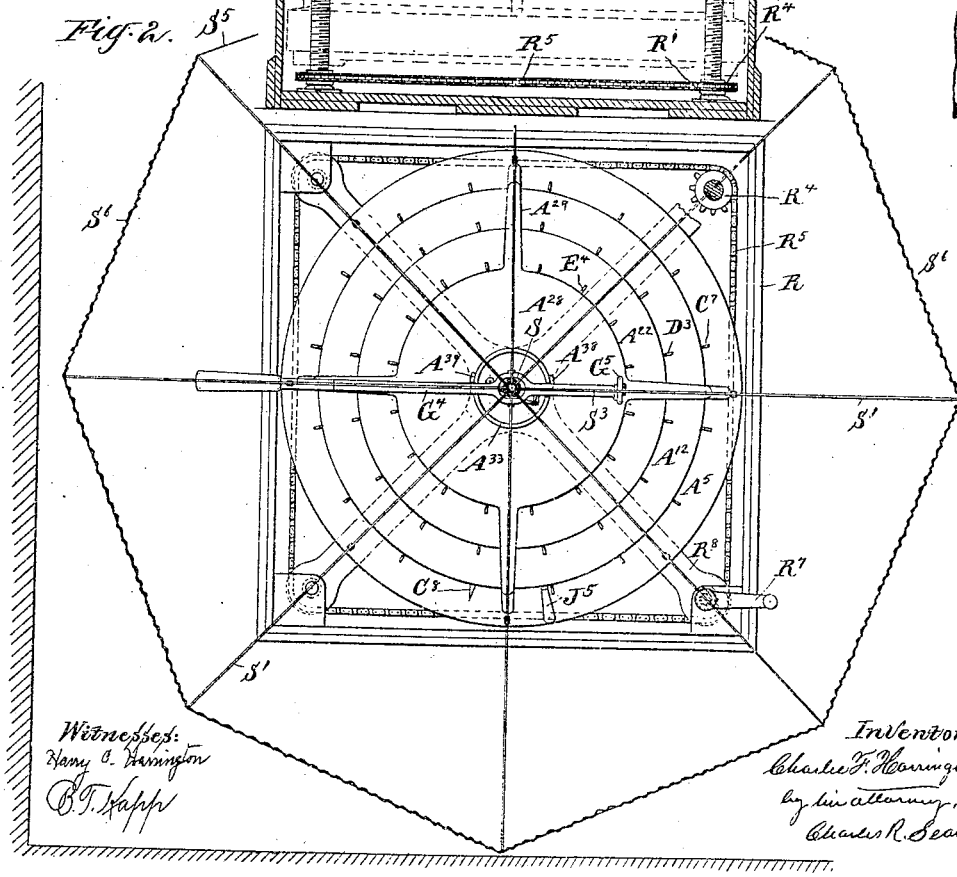

Figure 1 is a side elevation of the complete machine, certain portions being shown in vertical section; and Fig. 2 is a corresponding plan view. Fig. 3 is a vertical section through the main portion of the machine, on a larger scale, certain portions being in elevation. Fig. 4 is a corresponding plan view. Fig. 5 is a horizontal section taken on several different levels through the upper part of the machine and showing certain portions in plan view. Fig. 6 is a similar view on a lower level. Fig. 7 is a vertical diametrical section at one side of the machine, showing the actuators and counters in elevation on a still larger scale; and Fig. 8 is an elevation of the corresponding portion of the exterior. Fig. 9 is a vertical section, partly in elevation, showing the mechanism at the upper portion of the machine. Fig. 10 is a side elevation of one of the actuators. Fig. 11 is a corresponding plan view. Fig. 12 is a plan view of the locking means for preventing repeating. Fig. 13 is a vertical section showing such locking means in elevation, and Fig. 14 is a corresponding view showing the locking-bolt in section. Fig. 15 is a side view of the locking-bolt alone. Fig. 16 is a vertical section showing in side view the mechanism for receiving and depositing an independent ballot, and Fig. 17 is a corresponding front view. Fig. 18 is a side view of one of the counters on a still larger scale, and Fig. 19 is a corresponding front elevation. Fig. 20 is a vertical section, partly in elevation, corresponding to the lower portion of Fig. 3, but on a larger scale; and Fig. 21 is a plan of certain of the same parts.

Similar letters of reference indicate the same parts in all the figures.

The casing forming the turret comprises a series of rings or annular castings, one above the other and supported by brackets formed on each. The lowermost ring $A'$ has a circular bottom $A$, cast with four vertical tubular bosses $A^2$, receiving each a rod or standard $A^3$. The second ring $A^4$ is of the same outer diameter as the first and has an upwardly and inwardly inclined or con ical deck $A^5$. The second ring is supported above the first, with a circumferential space between them, by tubular bosses $A^6$, extending from the lower face of the deck to the corresponding bosses $A^2$ on the bottom and receiving the standards $A^3$. The tubular bosses also extend upwardly from the deck, as at $A^7$. The next ring $A^8$ is cylindrical and is supported above the inner portion of the ring $A^4$, with a narrow circumferential slot $a'$ between them, by tubular bosses $A^9$ on the radial brackets $A^{10}$. The fourth ring $A^{11}$ is of the same outer diameter as the ring below and is separated therefrom by a circumferential space and has an inclined deck $A^{12}$, terminating in a low cylindrical flange $A^{13}$. This fourth ring carries radial brackets $A^{14}$ and downwardly-extending tubular bosses $A^{15}$, receiving the standards, and these four rings are held, as shown, by nuts $A^{16}$ applied upon the upper ends of the standards and screwed firmly home. Each bracket $A^{14}$ carries a vertical standard $A^{17}$, screwed therein nearer the casing. The fifth ring $A^{18}$ is cylindrical and is supported above the flange $A^{13}$, with a narrow slot $a^2$ between them, by brackets $A^{19}$ and bosses $A^{20}$, inclosing the standards $A^{17}$. The sixth ring $A^{21}$ has an outer diameter equal to the ring $A^{18}$ below and is separated therefrom by a space and has an inclined deck $A^{22}$, terminating in a cylindrical flange $A^{23}$. This ring is similarly supported at the proper height by brackets $A^{24}$ and bosses $A^{25}$, through which the standards $A^{17}$ pass. The seventh and last ring $A^{26}$ forms the cover for the whole and has a depending flange $A^{27}$ and a circular top $A^{28}$. The flange $A^{27}$ is separated from the flange $A^{23}$ by a narrow circumferential slot $a^3$ and is supported by hollow brackets of inverted-U section (marked $A^{29}$) extending in the same plane as the top $A^{28}$ and receiving the standards $A^{17}$ in bosses $A^{30}$, forming seats for the holding-nuts $A^{31}$. Thus arranged there are, in effect, four cylindrical portions of the casing, each of less diameter than the next below, joined by three conical or inclined decks of correspondingly less diameters, and immediately above each deck is one of the narrow circumferential slots $a'$ $a^2$ $a^3$.

A vertical shaft B extends axially of the casing and is supported with liberty to partially rotate by a sleeve $B'$, having an inwardly-projecting flange $B^2$, engaged beneath an annular shoulder $B^3$ on the shaft at the bottom end. The sleeve $B'$ is loosely connected to the shaft, as will be explained, and supports the weight of the latter and its connections through a flange or wheel $B^6$, resting upon a washer $A^{32}$ on the bottom A of the casing. The upper end of the shaft is inclosed in a sleeve G, matching to an opening $a$ in the center of the top or cover $A^{28}$ and serving as a guide for the upper end of the shaft. The latter is surrounded at a little distance by a cylindrical fence or flange $A^{33}$, cast in one with the top or otherwise secured thereto.

Through each annular slot $a'$ $a^2$ $a^3$ projects the ends of one of three series of radial arms or actuators. Each series comprises sixteen actuators, and, as shown, each series differs in construction from the others. The actuators of the lowermost series are marked C, certain portions being designated by supernumerals, as $C'$ $C^2$. Each is preferably of sheet metal, as offering the desired qualities of lightness, stiffness, and strength, and consists of a flat horizontal body portion $C'$, having an opening larger than the sleeve $C^{11}$, on which it is mounted, the difference being made up by a ring $C^2$ of the same thicker than the body and serving to permit the actuators to be moved with little friction on the sleeve. The outer portion of the body is folded or bent, as at $C^3$, to stand vertically at a right angle to the main portion of the body, and to this vertical portion is riveted the vertical part $C^4$ of a bifurcated arm $C^5$, also of sheet metal, one part $C^6$ extending through the slot $a'$ and terminating in a small disk or finger-piece $C^7$, by which it may be moved circumferentially of the casing immediately above the deck $A^5$. All of this series are alike with the exception of one, which terminates in an index or pointer $C^8$ for a purpose to be described. The other arm $C^9$ of each fork terminates within the casing in a horizontal toe $C^{10}$, wider than the thickness of the sheet metal. The bodies of these sixteen actuators are mounted one above the other on the sleeve $C^{11}$, inclosing the lower portion of the shaft B, and are separated by washers $C^{12}$ and confined in place between a flange $C^{13}$ on the lower end of the sleeve and a nut $C^{14}$ on the upper end. The several arms are attached to the portions $C^3$ by their vertical parts $C^4$, so that all may be formed alike, and located in the same level by riveting at varying heights, and the bodies constituting the lower half of the series are applied with the folded part up, while the upper half is applied with the folded part down in order to save vertical space in the machine.

The second series of actuators is marked D. The bodies $D'$ are similar in all respects to those above described and are similarly mounted on a sleeve $D^8$, having rings $D^{11}$, inclosing the shaft B, and having a flange $D^9$ and nut $D^{10}$ and supported on a stationary bar $A^{34}$, to which the flange $D^9$ is secured, extending diametrically of the casing and carried by lugs (not shown) at opposite points on the interior of the ring $A^8$. The arms $D^2$ of this series differ widely from those of the series beneath. Each has a disk or head $D^3$ projecting through the slot $a^2$ above the deck $A^{12}$, and each has a portion $D^4$, terminating in a toe $D^5$, as before; but each has an opening $d$ and a channel $d'$ leading thereto, formed by two oppositely-placed lugs $D^6$ $D^7$, one above and the other below the channel, the lugs on each succeeding actuator being placed further from the shaft B for a purpose which will appear.

The upper series of actuators E are differently mounted. Each is pivoted at the inner end to a ring $E'$, the pivots being spaced as required, and the ring is held by screws $E^2$ to a diametrically-extending bar $A^{35}$, similar to the bar $A^{34}$ and supported on inwardly-projecting lugs $A^{36}$ on the interior of the casing-ring $A^{18}$. Each actuator E is bifurcated, as shown, and has an arm $E^3$ extending through the slot $a^3$ and carrying a head or disk $E^4$, the other arm $E^5$ terminating within the casing in a toe $E^6$.

So far as yet described the actuators C and D may be moved circumferentially in the slots $a'$ $a^2$ at pleasure, while the actuators E are limited in their movements by the hollow brackets $A^{29}$ and also by the eccentricity of their pivots relatively to the casing.

Upon the lowermost inclined deck $A^5$ in the vicinity of the pointer $C^8$ is a series of radially-arranged names of the political parties offering candidates for the several offices. As shown in the drawings five parties are represented, and a corresponding number of candidates' names similarly arranged is provided for, with an "Independent" space among the parties and a blank for an independent candidate among the names for each office, making six in all, in the vicinity of each actuator-head $C^7$, as under the headings "Governor," "Congressman."

The actuators D are permitted the longest range of motion and are therefore best adapted for service in the selection of candidates likely to be voted for in groups, as "Members of General Assembly," "Excise Commissioners," or "Board of Aldermen," the several names being arranged in groups in the order of their parties, one name of each party in each group, on the inclined deck $A^{12}$.

The actuators E, having a limited movement, are adapted for voting "Yes" or "No" or "For" or "Against" on certain propositions, as "Constitutional Amendment" or "Park Act," marked on the deck $A^{22}$ immediately below the heads $E^4$.

With the foregoing explanation the principle on which the invention is based may be understood. It is simply to place each actuator adjacent to the name or names of the candidate or candidates for that office or offices or at "Yes" or "No" for any proposition presented and means coacting with the actuators to register the selections. It is of course also necessary that means for setting all the candidate-actuators simultaneously for a strictly party vote shall be provided; that provision for permitting a "split ticket" to be voted must be made; that means for receiving votes for independent candidates not named on either party-ticket must be furnished; means for registering the selections and the easy and accurate counting of the same; means for resetting the machine at zero or "no candidate," returning all the actuators after an elector has voted; means for preventing "repeating," and means for insuring secrecy as to the choice made by the voter. All these essentials are provided for and will be described. First the means for registering will be explained. The sleeve G, inclosing the upper portion of the shaft B and extending through the top $A^{28}$, has an annular groove $g$ on its exterior, in which are received the ends of two pins $G'$ $G'$, extending through the skirt $G^2$ of a second sliding sleeve $G^3$, rotating with the shaft by means of a transverse pin $B^4$ through the latter, engaged in vertical slots $g'$, which permit the sliding sleeve and its connections to be raised or lowered relatively to the shaft by elevating and lowering the free end of an operating-lever $G^4$, fulcrumed on an antifriction-roller $G^5$ on the opposite end of the lever and engaged with the sliding sleeve $G^3$ by pins $G^6$ $G^6$, screwed into opposite sides of a yoke $G^7$, forming part of the lever and extending into corresponding holes in the sliding sleeve. The rising and sinking movements of the operating-lever are thus communicated to the sleeve G and to its radial arms $G^8$ without partaking in the partial rotations of the shaft. From the ends of the arms $G^8$ hang a corresponding number of rods $G^9$, supporting a ring $G^{10}$ near the bottom of the casing, and a similar ring $G^{11}$ at a higher level, (see Figs. 3, 5, 6, and 7,) and each arm also carries a shorter rod $G^{13}$ nearer the center, supporting a ring $G^{12}$ of smaller diameter near the top. The arms $G^8$ rise and sink within the hollow brackets $A^{29}$ and through suitable openings in the uppermost deck $A^{22}$. On the rings are groups of counters F, each having an operating star-wheel $F'$, the distance between each star-wheel and the next being but little in excess of the width of the actuator-toes, so that if one of the latter be placed even approximately near the name to be voted it will be struck by the corresponding star-wheel when the counter-rings are elevated by the operating-lever and turned to register one vote. All the counter-rings are elevated at once and by the same movement, and consequently all the candidates and propositions will be voted for which the actuators have been located. Sufficient space is left between groups of counters to permit the unobstructed passage of any toe the actuator of which has not been moved from zero.

The mechanism for voting for independent candidates is shown in detail in Figs. 16 and 17. H is a plate on the deck, one at each office, having a transverse slot $h$, from which extends a flattened tube H' downwardly within the casing. The lower end of the tube is normally closed by a swinging gate $H^2$, held in position by gravity and supported on pivots $H^3$ in lugs on the tube. An arm $H^4$ projects laterally from one side of the gate in the path of a cam-lever $H^5$, shaped to engage the arm $H^4$ when tilted and open the passage through the tube. The cam-lever is supported on the adjacent counter-ring with its tail $H^6$ occupying the same relative position as one of the star-wheels and having the same thickness. The actuator is moved to the sixth or independent space over the plate H, and a card ballot upon which the voter writes the name of the candidate is dropped into the slot $h$, but is prevented from passing through by the gate. The next elevation of the counter-ring brings the tail $H^6$ into contact with the actuator-toe and the gate is swung back, permitting the ballot to fall into any suitable receptacle (not shown) within the casing or into a chute leading to a receptacle conveniently placed.

The means for setting the actuators simultaneously to the several candidates' names comprising a party-ticket is shown as operating only the lowermost and intermediate actuators C and D, the upper series E, being arranged for voting only "Yes" or "No" or "For" or "Against," may be easily set individually to such propositions as are to be voted upon.

The setting mechanism comprises a wheel J, loosely mounted on the shaft B, the hub or center J' receiving pins $J^2$, set in an opening or yoke in a hand-lever $J^3$, one end of which is supported and rides upon a long segmental lug $A^{37}$ on the casing-ring $A^8$ and the other end $J^4$ projecting through a slot $a^4$ opposite to the lug $A^{37}$ and in the same portion of the casing. The projecting end is provided with a handle $J^5$, by which the wheel may be oscillated or partially rotated. The face or rim $J^6$ of the wheel is of considerable width or depth and is notched at opposite points $j\ j$ to receive the hand-lever. The wheel is supported by the latter and carries a series of pins $J^7$, projecting upwardly from the rim and adapted to engage the actuators D, lying each between two pins, and a similar series $J^8$, projecting downwardly and similarly engaging the lower series of actuators C. The slot $a^4$ has a notch $a^5$ at about the mid-length of the lower edge, in which the hand-lever $J^4$ lies normally with the wheel depressed sufficiently to remove the pins $J^7$ from the paths of the actuators D and permit them to be moved without interference with the pins, while the lower set of pins $J^8$ are of such length as to lie in the path of the actuators C in both the depressed and elevated positions of the wheel. When the hand-lever is raised out of its notch $a^5$ and moved circumferentially of the casing in the slot $a^4$, the wheel J is correspondingly elevated and partially rotated, its pins engaging all the actuators of both series and carrying them all together in the same direction as far as desired. The hand-lever may then be moved back to the notch $a^5$, the space between the pins permitting the movement without displacing the actuators, which retain their positions by gravity and friction, and an upward movement of the counter-rings will register on all counters whose paths are in line with the toes of the actuators. The pointer $C^8$ on one of the actuators indicates the position of all the actuators and is shown as moved to "Dem." indicating the Democratic ticket. If by inadvertence the pointer be moved beyond the desired party name, number, or emblem indicating the party, it may be moved backward by reversing the direction of movement of the lever sufficiently to take up the lost motion between the pins and bring the latter against the opposite sides of the actuators and force them back, the hand-lever being again brought to the central position and allowed to fall into its notch. The vote will be for all the party candidates indicated by the position of the pointer, and, as before explained, the width of the toes $C^{10}$ and $D^5$ on the actuators is sufficient to insure contact with the corresponding star-wheels even though the pointer be not exactly in line with the party name.

When, as above described, the hand-lever has been dropped into its notch $a^5$, the wheel J is lowered and the actuators D are entirely freed, while the actuators C are also free to be moved individually as far as permitted by the next pin in the lower set $J^8$, these pins being so spaced as to allow such movement to the extent of covering all the candidates and independent space for each office, and the machine is thus conditioned for voting a "split ticket." As many party candidates may be voted as desired, any "scratches" being voted by moving the actuator C for that office to any other candidate or to the independent space. The actuators D being entirely free may be moved to vote any candidate or group of candidates or independent votes.

The mechanism for resetting all the actuators at zero is operated by the shaft B. The circular fence or flange $A^{33}$ on the top $A^{28}$, encircling the shaft, is provided with a notch $a^6$, into which the operating-lever $G^4$ may drop, and has a stop $A^{38}$ for preventing the movement of the lever past the notch in one direction and another stop $A^{39}$ to limit the motion in the opposite direction, the stops being so located as to permit a half-revolution of the shaft. Assuming the several actuators to be located as desired by the voter and the operating-lever in the notch $a^6$, the act of raising the lever raises all the counters and registers votes for the candidates selected. The subsequent movement of the operating-lever upon the upper edge of the fence $A^{33}$ to the opposite stop $A^{39}$ causes the shaft B to make the half revolution and carries with it any attached mechanism. K is a wheel or spider-frame located below the sleeve G and having a hub K′ inclosing the shaft and held in place vertically by a pin $B^5$, set in the shaft and lying in a slot or long notch $k$ in the hub. The rim of the spider-frame carries a series of downwardly-projecting pins $K^2$, one between each actuator E and the next, adapted to contact with the actuators and cause them to move. The slot or notch $k$ permits a portion of the movement of the shaft to be idle, but is so proportioned as to bring all the actuators of the series E to the zero or non-voting position at the time the shaft completes its half-turn and the operating-lever $G^4$ reaches the stop $A^{39}$.

The resetting mechanism for the lowermost series C of the actuators is somewhat similar. A frame or wheel $B^6$ on the sleeve B′ at the lower end of the shaft has a rim $B^7$, carrying a series of upwardly-projecting pins $B^8$, between which lie the actuators C. A slot $b$ in the sleeve and a pin $B^9$ in the shaft permit the required lost motion and insure the return of all the actuators C to zero. Segmental slots $b'$ in the wheel $B^6$ are provided, through which pass the screws or bolts by which the flange $C^{13}$ is fixed to the bottom A.

The means for the return of the intermediate series D of the actuators requires a different mechanism, for the reason that the actuators of this series have practically unlimited movement greater than could be permitted by a series of pins in the rim of a wheel, and several may be grouped together, as indicated at "Members of General Assembly" in Fig. 5, necessitating a selecting mechanism adapted to engage each its individual actuator and return it. This is accomplished by two spider-frames L and M, one above the other, equipped with lugs L′ M′, projecting upwardly on the upper frame L and downwardly on the lower frame M. The lugs on each are arranged successively farther from the center, but stand in equally-spaced radii, giving a volute-like form to the frames. The two frames coincide in position when the operating-lever is against the stop $A^{39}$, with just space enough between the lugs L′ M′ to receive an actuator. The lowermost frame M of the pair has a hub $M^2$, fixed on the shaft B by a pin $B^{10}$, and carries a sprocket-wheel $M^3$, fixed by the same pin or otherwise to turn with the shaft. The upper frame L is supported on the lower frame (see Fig. 9) and has a hub $L^2$ inclosing the lower part of the hub or sleeve $M^2$ below the sprocket-wheel $M^3$. On the hub $M^2$ is fixed a gear-wheel $M^4$, meshing with a gear-wheel N, mounted on a stud $A^{40}$, fixed in the stationary bar $A^{35}$. The boss N′ of the gear-wheel N carries a sprocket-wheel $N^2$ in the same plane with the sprocket-wheel $M^3$ and connected to the latter by a sprocket-chain $N^3$. The result attained by these gear and sprocket wheels is the movement of the frames L and M in opposite directions.

The actuators D, as before described, are each provided with lugs $D^7$ and $D^8$ above and below a channel $d'$, in which the frames L and M may both move, and as the lugs $D^7$ and $D^8$ on the actuators and the lugs L′ and M′ on the frames are successively and equally removed farther and farther from the shaft it follows that in moving the frames in opposite directions into coincidence the lugs thereon will contact with the corresponding lugs on the actuators and with no others, and consequently return all the actuators D to their respective zero or non-voting positions ready for the next voter to locate them as he may desire after freeing them by the return movement of the operating-lever $G^4$ to the notch $a^6$.

To prevent "repeating" or successive raising and lowering movements of the operating-lever by the same voter, the mechanism shown in detail in Figs. 12, 13, 14, and 15 is provided. O is a horizontally-swinging latch pivoted on the top $A^{28}$ within the fence $A^{33}$, having a vertical lug O′, arranged to be forced under the skirt $G^2$ of the sliding sleeve $G^3$ when the latter is elevated by the action of a spring $O^2$ and also equipped with a vertical arm $O^3$ sufficiently in rear of the lug O′ to avoid the skirt and sufficiently high to be engaged by a dog $G^{14}$ on the skirt, arranged to force the lug O′ from beneath the skirt at the proper time. $O^4$ is a lever pivoted to a standard $A^{41}$ within the fence, the long arm normally depressed by gravity and adapted to engage an arm $O^6$ on the latch and hold its lug O′ clear of the skirt and the short arm $O^5$ arranged to be depressed by the operating-lever $G^4$ in entering the notch $a^6$ in the fence. The operation of the latch is as follows: Assuming the operating-lever to be elevated and in contact with the stop $A^{39}$, the dog $G^{14}$ will have struck the vertical arm $O^3$ and thrown the latch outward far enough to permit the lever $O^4$ to fall and engage it and hold the lug O′ away from the skirt $G^2$ until released. In this position the counter-rings are in the elevated condition and cannot be lowered, because the operating-lever is held up by the fence. The movement of the operating-lever toward the notch $a^6$ retracts the dog $G^{14}$, but the latch is still held, as above described, until the operating-lever sinks into the notch and by contact with the lever-arm $O^5$ releases the latch, allowing the spring $O^2$ to draw the lug O′ against the skirt $G^2$; but as the latter has partially descended the lug cannot get beneath it. This condition obtains until the operating-lever is raised to operate the counters, when at the sufficient lifting of the skirt $G^2$ the lug O′, impelled by the spring $O^2$, immediately moves beneath it and prevents a second descent of the operating-lever until the latter has been again moved back to its stop $A^{39}$ and the machine conditioned for a succeeding voter. This locking mechanism is concealed beneath a cover-plate (not shown) within the fence to prevent tampering, the cover being slotted to permit the lever $O^4$ to act.

The vote is counted by inspection of the several counters and noting the number of times they have been operated, as indicated by the numbers shown thereon. To prevent confusion, provision is made for allowing only the counters for candidates for one office to be inspected at one time. This is effected by providing belts or bands P P' $P^2$, of metal, encircling the spaces between the casing-rings A' $A^4$ $A^8$ $A^{11}$, and $A^{18}$ $A^{21}$ and supported in the annular rabbets $a^7$ on the margins of such rings. The ends of each belt are riveted together, as at $P^3$, and serve as a means for moving the belt circumferentially. On each belt is a sliding door $P^4$, adapted to cover an aperture $p$ in the belt and be held closed when required by a lock $P^5$. In counting the votes the door is unlocked and slid from the aperture and the belt moved to present the aperture opposite a group of counters representing the vote for candidates for that office, the results thereon being noted by the election board. The belt is again shifted to the next group, and so on until all have been recorded. The receptacles (not shown) for the independent ballots may be reached through the same aperture or otherwise.

If the election be limited to only a few offices or candidates, or if for any reason it is desirable to temporarily omit any of the counters F, such unnecessary counters may be rendered inoperative by turning them outwardly away from the line of the actuator-toes, as indicated in dotted lines in the lower portion of Fig. 7. Each counter has a block $F^2$, having an angular lower face, (see Fig. 18,) and the counter is mounted on a pin $F^3$, extending through the block and into ears $F^4$, secured to the counter-ring, on which the counter may be turned. Between the ears and beneath the block is a flat spring $F^5$, pressing upward against the lower face of the block presented thereto. In one position the counter is held upright with its star-wheel in position to contact with an actuator-toe, and in the other position the counter is held by the action of the spring against the other face of the block in an inclined position in which the star-wheel is out of the line of contact.

The machine may be supported on legs or other standards to present its decks conveniently and may be inclosed in any suitable booth. I have devised a supporting means also adapted to serve as a storage or transportation receptacle for the machine, as illustrated in Figs. 1 and 2. R is a box or receptacle, shown as rectangular, having inside dimensions large enough to allow the machine to sink therein. At each corner of the bottom is a step R' for a screw-shaft $R^2$, guided above in a corner-plate $R^3$, secured in the angle near the top. On each screw-shaft is a sprocket-wheel $R^4$ just above the step, and all four of the sprocket-wheels are connected by a sprocket-chain $R^5$, so as to turn together and in the same direction, and one of the screw-shafts has a squared extension $R^6$ projecting above its plate $R^3$ and adapted to receive the square socket on a wrench or crank $R^7$, by which motion may be communicated to all the screw-shafts simultaneously. $R^8$ is a cross-frame of four arms carrying at the extremity of each a boss $R^9$, which is bored and tapped to match to its screw-shaft, which extends therethrough. Thus arranged the turret or casing may be easily raised or lowered relatively to the box. The latter may be supplied with a cover. (Not shown.) The operating-lever is preferably in two sections, telescoped together at $G^{15}$ and arranged to be easily separated at that joint, allowing the machine to descend completely into the box, in which the handle portion of the lever may also be deposited.

The curtain-booth shown may be employed. It consists of a tube S, fitting snugly upon the projecting upper end of the shaft B and turning therewith. The upper end carries a series of arms S' of light but stiff wire supported in sockets $S^2$ and held in position by links $S^3$, hinged thereto at $S^4$ and having their free ends engaged in the open upper end of the tube. A cord or wire $S^5$ joins the overhung ends of the arms, upon which is hung a curtain $S^6$, extending about seven-eighths of the distance around the machine. The latter being set in a corner of the voting-place, as indicated in Fig. 2, the voter entering the booth and turning the operating-lever the half-revolution required for conditioning the machine to receive or record his vote also turns the tube S and its arms and carries the opening at which he entered around to the wall, thus concealing the machine and himself and allowing him to make his selections in secret. The reverse movement in leaving the booth conditions it and the machine for the next voter.

The operation of voting may be briefly described as follows: The voter finds the operating-lever against the stop $A^{39}$, in which position the counter-rings are in the elevated position. He moves the operating-lever $G^4$ around to the notch $a^6$ and permits it to descend. The half-revolution releases all the actuators from their resetting means, and the descent of the counters takes place at a time when all the actuators are at zero and out of the paths of the star-wheels. The voter then grasps the hand-lever $J^5$, raises it from its notch $a^5$ and moves it in the slot $a^4$ until the pointer $C^8$ is at the name of the party whose ticket he wishes to vote and returns the hand-lever to its notch $a^5$. If a straight ticket is to be voted, he then raises the operating-lever out of its notch $a^6$ and moves the operating-lever in the reverse direction back to the stop $A^{39}$. If a split ticket is to be voted, he moves the actuator from any party candidate at which it was placed to any other candidate whose name appears for that office or to the independent space and deposits his ballot in the slot. He then raises the operating-lever and moves it as before. By moving the hand-lever the actuators may all be set for independent candidates, in which case the voter will deposit ballots in all the slots for such names as he selects for the various offices. $F^6$ is a counter, showing its figures through an opening in the top of the machine and operated through means not shown, but which will be readily understood, by the lifting of the arms $G^8$. Its function is to indicate the total vote or the number of times the operating-lever has raised. The counters F in each group are preferably numbered to correspond with similar figures on the deck above adjacent to the candidates' names to serve as an aid in identifying each counter with its candidate in counting up the result.

Modifications may be made within wide limits without departing from the principle of the invention or sacrificing its advantages. The volute spider-frames employed for returning the actuators D may be substituted for the means shown for returning the other actuators. The sprocket wheels and chain for inducing the reverse movements of such spider-frames may be replaced by spur gear-wheels. Although I have shown sixteen actuators in each series, the number may be greater or smaller in each or in all. The number of political parties represented may be increased or diminished, requiring a corresponding change in the number of counters in each group. Instead of three decks and three series of actuators there may be more or less, or one deck and one series of actuators alone may serve. The receptacle for the machine may be varied or omitted, as may also the curtain and frame serving as a booth.

I claim—

1. In a voting-machine, a horizontally-disposed circular casing having an annular slot and carrying a plurality of names or other identifying symbols of candidates to be voted for, a registering mechanism for each of such names, an actuator loosely mounted on a vertical center in said casing and having a portion extending radially through said slot to the exterior of said casing, whereby said actuator may be swung horizontally to a selected name and into operable relation to the registering mechanism therefor, and means for simultaneously moving said registering mechanisms vertically relatively to said actuator to operate the registering mechanism for the selected name by contact with said actuator.

2. In a voting-machine, a horizontally-disposed circular casing having an annular slot and carrying a plurality of groups of names or other identifying symbols of candidates to be voted for, a registering mechanism for each of said names, an actuator for each group loosely mounted on a vertical center in said casing and having a portion extending radially through said slot, whereby each of said actuators may be swung horizontally to a selected name in its group and into operable relation to the registering mechanism for such name, and means for simultaneously moving said registering mechanisms vertically relatively to said actuators to operate the registering mechanisms for the selected names by contact with said actuators.

3. In a voting-machine, a horizontally-disposed circular casing having an annular slot and carrying a plurality of groups of names or other identifying symbols of candidates to be voted for, each group representing an office and having its names arranged in the same party order, a registering mechanism for each of said names, a plurality of actuators loosely mounted to swing horizontally in said casing and having a portion on each actuator extending radially through said slot to the exterior of said casing, whereby any of said actuators may be swung independently to a selected name, means for engaging said actuators and swinging them simultaneously to the names of candidates of the same party in the several groups and into operable relation to the registering mechanisms for such names, and means for simultaneously moving said registering mechanisms vertically relatively to said actuators to operate the registering mechanisms for the selected names by contact with said actuators.

4. In a voting-machine, a circular casing having an annularly-arranged slot, a deck on said casing bearing the names or other identifying symbols of the candidates, a plurality of radially-arranged actuators within said casing having a portion protruding through said slot adjacent to said names, and means for moving said actuators to the names selected and into operable relation with said registering mechanisms therefor.

5. In a voting-machine, a circular casing having an annularly-arranged slot, a deck on said casing bearing a plurality of groups of names or other identifying symbols of the candidates, each group representing an office and having the names thereon arranged in the same party order in each, registering mechanism for each of said names, a radially-arranged actuator for each group centered within said casing and having a portion protruding through said slot, means for setting the actuators simultaneously to the names of candidates of the same party in said groups, and means for moving said actuators and mechanisms relatively to each other to operate said mechanisms.

6. In a voting-machine, a circular casing having an annularly-arranged slot, a deck on said casing bearing a series of party names or symbols and a plurality of groups of names or other identifying symbols of the candidates, each group representing an office and having the names therein arranged in the same party order as said series, registering mechanism for each of said names, a radially-arranged actuator for each group and for said series, the actuator for the latter having a projecting part extending through said slot adjacent to said deck and serving as an index, means for moving all of said actuators simultaneously to set them to vote a party-ticket indicated by the position of said index relatively to said series, and means for moving said actuators and mechanisms relatively to each other to operate said mechanisms.

7. In a voting-machine, a casing, a plurality of registering mechanisms within said casing, a plurality of actuators arranged radially thereof on a central bearing and adapted to swing thereon into operable relation with said mechanisms, and means for moving said mechanisms relatively to said actuators to operate said mechanisms.

8. In a voting-machine, a casing, a plurality of registering mechanisms arranged in a series of groups within said casing, a plurality of actuators arranged radially of said casing on a central bearing and adapted to swing thereon, means for swinging said actuators simultaneously into operable relation to selected registering mechanisms in said groups, and means for moving said series of registering mechanisms relatively to said actuators to operate said mechanisms.

9. In a voting-machine, a casing, a plurality of actuators arranged radially therein on a central bearing and adapted to swing thereon, a plurality of registering mechanisms in a series of groups concentric to said bearing, one group for each actuator and the registering mechanisms of each of groups arranged in the same party order, means for engaging and swinging said actuators into operable relation with the same party mechanism in each group and releasing said actuators, whereby any of the latter is free to be moved into operable relation with another mechanism in the same or another group, and means for moving said series of mechanisms relatively to said actuators to operate said mechanisms.

10. In a voting-machine, a casing, a vertical shaft located therein, a series of radially-arranged actuators centered on said shaft, a frame centered on said shaft and carrying registering mechanisms arranged concentrically thereto, means for moving said actuators into operable relation with said registering mechanisms, and means for raising said frame and operating said mechanisms by contact with said actuators.

11. In a voting-machine, a casing, a vertical shaft located therein, a series of radially-arranged actuators centered on said shaft, a frame centered on said shaft and carrying registering mechanisms arranged concentrically thereto, means loosely mounted on said shaft and operable from the exterior of said casing for simultaneously moving said actuators into operable relation with said registering mechanisms, and means for raising said frame and operating said mechanisms.

12. In a voting-machine, a casing, a vertical shaft located therein, a series of radially-arranged actuators loosely centered on said shaft, registering mechanisms arranged concentrically thereto, means for moving said actuators into operable relation with said registering mechanisms, means for raising said mechanisms and operating them by contact with said actuators, and means carried by said shaft for returning said actuators to the original position.

13. In a voting-machine, a casing, a vertical shaft located therein, a series of radially-arranged actuators loosely centered on said shaft, a frame loosely centered on said shaft, registering mechanisms carried by said frame and arranged concentrically to said shaft, means for moving said actuators into operable relation with said registering mechanisms, means carried by said shaft for returning said actuators to the original positions, a lever connected to said shaft and frame whereby the latter may be raised to operate said registering mechanisms and the shaft turned to return said actuators.

14. In a voting-machine, a casing having a vertical shaft therein, a series of radially-arranged actuators loosely centered on said shaft, a frame loosely centered on said shaft and carrying registering mechanisms arranged concentrically thereto, means for moving said actuators into operable relation with said registering mechanisms, means for raising said frame to operate said registering mechanisms, and a locking means arranged to prevent a succeeding descent of said frame until released.

15. In a voting-machine, a casing, a vertical shaft therein, a series of radially-arranged actuators loosely centered on said shaft, a frame loosely centered on said shaft and carrying registering mechanisms arranged concentrically thereto, means for moving said actuators into operable relation with said registering mechanisms, means moving with said shaft for returning said actuators to the original positions, a lever connected to said shaft and to said frame and adapted to raise and lower the latter to operate said registering mechanisms and also to turn said shaft, locking means arranged to prevent the descent of said frame, and means actuated by a partial revolution of said shaft for releasing said locking means.

16. In a voting-machine, a casing, a vertical shaft therein, a series of radially-arranged actuators loosely centered on said shaft, a frame loosely centered on said shaft and carrying registering mechanisms arranged concentrically thereto, means for moving said actuators into operable relation with said registering mechanisms, means moving with said shaft for returning said actuators to the original positions, a vertical flange on said casing surrounding said shaft, a notch in said flange, a lever connected to said shaft and frame and adapted to sink and rise in said notch and to ride in the raised condition upon said flange, a locking means arranged to prevent a succeeding descent in said notch, and means for releasing said locking means by the partial revolution of said shaft.

17. In a voting-machine, a circular casing having an annularly-arranged slot, a vertical shaft centrally located in said casing, a series of actuators loosely mounted on a sleeve inclosing said shaft, and having a portion of each extending through said slot, and each capable of being swung independently by such portion, a wheel loosely mounted on said shaft and operated from the exterior of said casing and arranged to be partially rotated and raised and lowered, pins on said wheel adapted to engage said actuators and swing them simultaneously when said wheel is in one vertical position and to release said actuators and permit them to be moved independently when said wheel is in the other vertical position, and a series of concentrically-arranged registering mechanisms operated by said actuators, whereby all of said actuators may be moved simultaneously to certain selected registering mechanisms and either of said actuators subsequently moved to another of said mechanisms.

18. In a voting-machine, a casing, a vertical shaft therein, a series of actuators loosely centered on said shaft and capable of swinging thereon, lugs on said actuators at different distances from said shaft, a wheel moving with said shaft and having lugs similarly arranged and adapted to engage said lugs on said actuators and return the latter to an original position.

19. In a voting-machine, a casing, a shaft therein, a series of actuators loosely centered on said shaft and capable of swinging thereon, lugs on said actuators arranged in pairs, each pair at a different distance from said shaft, a pair of wheels moving with said shaft in opposite directions, each having lugs similarly arranged and adapted to engage said lugs on said actuators and return them to an original position.

20. In a voting-machine, a circular casing having a plurality of circular decks and an annular slot adjacent to each of said decks, a vertical shaft arranged centrally of said casing, a plurality of series of radial actuators loosely centered on said shaft, each actuator having a portion or head projecting through one of said slots by which it may be moved independently therein, and a portion or toe within said casing adapted to lie in the path of a registering mechanism when presented thereto, a wheel loosely mounted on said shaft and adapted to engage the actuators of such plurality of series and move them simultaneously into operative relation to certain of said registering mechanisms, and adapted to release said actuators and permit them to be moved independently by said heads.

21. In a voting-machine, a circular casing having a plurality of circular decks and an annular slot adjacent to each of said decks, a vertical shaft arranged centrally of said casing, a plurality of series of registering mechanisms arranged concentrically in said casing, a plurality of radial actuators loosely centered on said shaft, each actuator having a portion or head projecting through one of said slots by which it may be moved independently therein, and a portion or toe within said casing adapted to lie in the path of one of said registering mechanisms when presented thereto, a wheel loosely mounted on said shaft and adapted to engage the actuators of said plurality of series and move them simultaneously into operative relation to certain of said registering mechanisms, and adapted to release said actuators and permit them to be moved independently by said heads, and means for moving said registering mechanisms relatively to said actuators to operate said mechanisms.

22. In a voting-machine, a casing composed of annular superposed sections, portions of which are cylindrical and portions conical, each succeeding conical portion being of less diameter, the said sections separated from each other to form annular slots and spaces, and supported by brackets and bosses on said sections engaged with standards, the whole forming a turret-like structure having inclined decks of different diameters.

23. In a voting-machine, a casing composed of annular superposed sections separated from each other to form annular spaces, series of registering mechanisms within said casing adjacent to said spaces, belts covering said spaces and adapted to be moved circumferentially of said casing, and an opening in each belt through which said registering mechanisms may be inspected.

24. In a voting-machine, a casing composed of annular superposed sections separated from each other to form annular spaces, series of registering mechanisms within said casing adjacent to said spaces, annular belts covering said spaces and adapted to be moved circumferentially of said casing, an opening in each belt through which said registering mechanisms may be inspected, a cover for said opening, and a locking means for said cover.

25. In a voting-machine, a casing composed of annular sections having an annular space between them, registering mechanisms within said casing adjacent to said space, an annular belt covering said space and adapted to be moved circumferentially of said casing, an opening in said belt through which said registering mechanisms may be inspected, and means for closing and locking said opening.

In testimony that I claim the invention above set forth I affix my signature in presence of two witnesses.

CHARLES F. HARRINGTON.

Witnesses:
HARRY C. HARRINGTON,
CHARLES R. SEARLE